United States Patent
Park et al.

(10) Patent No.: US 7,456,557 B2
(45) Date of Patent: *Nov. 25, 2008

(54) EXTERNAL LIGHT-SHIELDING LAYER, FILTER FOR DISPLAY DEVICE INCLUDING THE EXTERNAL LIGHT-SHIELDING LAYER AND DISPLAY DEVICE INCLUDING THE FILTER

(75) Inventors: Dae-Chul Park, Suwon-Si (KR); Jae-Young Choi, Seoul (KR); Tae-Soon Park, Suwon-Si (KR); Sang-Cheol Jung, Seongnam-Si (KR); Jin-Woo Yeo, Seoul (KR); Jin Seo, Dajeon Metropolitan (KR)

(73) Assignee: Samsung Corning Precision Glass Co., Ltd., Gumi (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/966,758

(22) Filed: Dec. 28, 2007

(65) Prior Publication Data

US 2008/0088215 A1    Apr. 17, 2008

Related U.S. Application Data

(63) Continuation of application No. 11/321,517, filed on Dec. 28, 2005.

(30) Foreign Application Priority Data

May 4, 2005    (KR) ............... 10-2005-0037658
Sep. 2, 2005   (KR) ............... 10-2005-0081801
Nov. 23, 2005  (KR) ............... 10-2005-0112547

(51) Int. Cl.
*H01J 5/16*     (2006.01)
*H01J 61/40*    (2006.01)
*H01K 1/26*     (2006.01)
*H01K 1/30*     (2006.01)

(52) U.S. Cl. .............. 313/112; 313/110; 313/111; 313/113; 313/582; 313/583; 313/584; 313/585; 313/586; 313/587; 353/69; 353/122

(58) Field of Classification Search ......... 313/110–113, 313/582–587; 353/69, 122
See application file for complete search history.

(56) References Cited

U.S. PATENT DOCUMENTS

| 5,939,826 | A  | 8/1999  | Ohsawa et al. |
| 6,262,364 | B1 | 7/2001  | Yoshikawa et al. |
| 6,576,352 | B2 | 6/2003  | Hirai |
| 6,657,387 | B1 | 12/2003 | Yoo |

(Continued)

FOREIGN PATENT DOCUMENTS

CN    1337589    2/2002

(Continued)

OTHER PUBLICATIONS

Japanese Office Action issued in Japanese Patent Application No. JP 2006-129227 dated Mar. 12, 2007.

(Continued)

*Primary Examiner*—Kimberly D Nguyen
*Assistant Examiner*—Mary Ellen Bowman
(74) *Attorney, Agent, or Firm*—McDermott Will & Emery LLP

(57) ABSTRACT

An external light-shielding layer capable of enhancing a visible light transmittance and a contrast ratio and preventing Moiré fringe and Newton ring phenomena, a display filter including the external light-shielding layer, and a display device including the display filter. The external light-shielding layer includes a transparent resin matrix, and a plurality of light-shielding patterns formed on the transparent resin matrix and spaced apart from each other in a predetermined interval, wherein a bias angle ($\alpha$) formed between a traveling direction of the light-shielding patterns and the longer side of the matrix is in a range of about 5 to 80 degrees.

20 Claims, 13 Drawing Sheets

U.S. PATENT DOCUMENTS

| | | | |
|---|---|---|---|
| 2002/0036733 | A1 | 3/2002 | Park et al. |
| 2003/0046839 | A1 | 3/2003 | Oda et al. |
| 2004/0051447 | A1 | 3/2004 | Okinaka et al. |
| 2004/0239248 | A1 | 12/2004 | Chang et al. |
| 2004/0253413 | A1 | 12/2004 | Baba et al. |
| 2004/0263039 | A1 | 12/2004 | Takei et al. |
| 2005/0162087 | A1 | 7/2005 | Kim et al. |
| 2005/0225239 | A1 | 10/2005 | Min et al. |
| 2006/0194020 | A1 | 8/2006 | Naito et al. |

FOREIGN PATENT DOCUMENTS

| | | |
|---|---|---|
| CN | 1574164 | 2/2005 |
| CN | 1610045 | 4/2005 |
| CN | 1681065 | 10/2005 |
| JP | 8-138559 | 5/1996 |
| JP | 10-214567 | 8/1998 |
| JP | 2000-114772 | 4/2000 |
| JP | 2000-323049 | 11/2000 |
| JP | 2002-533899 | 10/2002 |
| JP | 2003-58071 | 2/2003 |
| WO | WO 00/39830 | 7/2007 |

OTHER PUBLICATIONS

Japanese Office Action issued in Japanese Patent Application No. JP 2006-129277 dated Aug. 8, 2007.

Chinese Office Action issued in Chinese Patent Application No. 200510048857.

EXTERNAL LIGHT-SHIELDING LAYER, FILTER FOR DISPLAY DEVICE INCLUDING THE EXTERNAL LIGHT-SHIELDING LAYER AND DISPLAY DEVICE INCLUDING THE FILTER

RELATED APPLICATIONS

This application is a Continuation of U.S. application Ser. No. 11/321,517, filed Dec. 28, 2005, which claims priority from Korean Patent Application Nos. 10-2005-0037658, 10-2005-0081801 and 10-2005-0112547 filed on May 4, Sep. 2 and Nov. 23, 2005, respectively, in the Korean Intellectual Property Office, the disclosures of which are incorporated herein by references in their entireties.

BACKGROUND OF THE INVENTION

1. Field of the Invention

The present invention relates to an external light-shielding layer, a filter for a display device including the external light-shielding layer, and a display device including the filter. More particularly, the present invention relates to a filter for a display device including an external light-shielding layer which can enhance contrast ratio in a bright room and a Moiré phenomenon, and a display device including the display filter.

2. Description of the Related Art

As modern society becomes more information oriented, the technology of image display devices and apparatuses is advancing, and these devices are becoming widespread. In particular, image display devices are in widespread use in devices such as TV screens and PC monitors. Thinly built wide screens have become mainstream display devices.

In particular, a plasma display panel (PDP) is gaining popularity as a next-generation display device to replace a cathode ray tube (CRT) because it is thin, has a large screen, and can be readily fabricated. A PDP device displays images based on a gas discharge phenomenon, and exhibits superior display characteristics, e.g., a high display capacity, high luminance and contrast, free from afterimage, and a wide viewing angle.

In a PDP device, when a direct current (DC) or alternating current (AC) voltage is applied to electrodes, a gas plasma discharge occurs that produces ultraviolet (UV) light. The UV emission excites adjacent phosphors to emit visible light.

Despite the above advantages, PDPs have several challenges associated with driving characteristics, including an increase in electromagnetic (EM) radiation, near-infrared (NIR) emission, phosphor surface reflection, and an obscured color purity due to orange light emitted from neon (Ne), helium (He) or xenon (Xe) that is used as a sealing gas.

The electromagnetic (EM) radiation generated by PDPs may adversely affect humans and cause electronic devices such as wireless telephones or remote controls to malfunction. Thus, to use such PDPs, there is a need to reduce the EM radiation emitted from the PDPs to a predetermined level or less, e.g., by shielding. Various PDP filters have been used for such shielding, and to reduce unwanted reflections and enhance color purity. For example, various PDP filters having an EM shielding function and a NIR wave shielding function can be used with PDPs.

Conventional PDP filters cannot, however, prevent external light from entering a panel assembly in a bright room condition. External light that enters the panel assembly may undergo interference with light emitted from a discharge cell in the panel assembly, thereby lowering a bright room contrast, ultimately degrading the image display quality of PDPs.

Additionally, in conventional PDP filters, a Moiré phenomenon is generated due to interference fringes created when two or more periodic patterns are formed between pixels and PDP filters, which may degrade image display quality of PDPs.

SUMMARY OF THE INVENTION

The present invention provides an external light-shielding layer which can enhance a contrast ratio in a bright room and prevent a Moiré phenomenon.

The present invention also provides a display filter including the external light-shielding layer.

The present invention also provides a display device including the display filter.

The above-stated objects and other objects, features and advantages of the present invention will become clear to those skilled in the art upon review of the following description.

According to an aspect of the present invention, there is provided an external light-shielding layer for a display filter, the external light-shielding layer including a transparent resin matrix, and a plurality of light-shielding patterns formed on the transparent resin matrix and spaced apart from each other layer in a predetermined interval, wherein a bias angle ($\alpha$) formed between a traveling direction of the light-shielding patterns and the longer side of the matrix is in a range of about 5 to 80 degrees.

According to another aspect of the present invention, there is provided a display filter including display filter including a filter base, and an external light-shielding layer disposed on a plane of the filter base and having a transparent resin matrix and a plurality of light-shielding patterns formed on a surface of the transparent resin matrix and spaced apart from each other layer in a predetermined interval, wherein a bias angle ($\alpha$) formed between a traveling direction of the light-shielding patterns and the longer side of the matrix is in a range of about 5 to 80 degrees.

According to still another aspect of the present invention, there is provided a display filter including a transparent substrate, an external light-shielding layer formed on the transparent substrate and having a transparent resin matrix and a plurality of light-shielding patterns formed on a surface of the transparent resin matrix and spaced apart from each other layer in a predetermined interval, and a conductive EM radiation shielding layer formed on the transparent substrate in a mesh pattern. Here, a bias angle difference ($\beta-\alpha$) ranges from about 5 to 40 degrees or from 50 to 75 degrees, assuming that the bias angle difference ($\beta-\alpha$) is created between a bias angle ($\beta$) formed between the imaginary plane extended from the mesh pattern and the longer side of the matrix and a bias angle ($\alpha$) formed between the traveling direction of the light-shielding patterns and the longer side of the matrix.

According to yet another aspect of the present invention, there is provided a display device including a panel assembly having a transparent front substrate and a rear substrate disposed to face each other, and a plurality of cells between the front substrate and the rear substrate, an external light-shielding layer directly attached to the front substrate of the panel assembly, and a display filter facing the external light-shielding layer and having an antireflection (AR) shielding function and/or an EM radiation shielding function, a near-infrared ray (NIR) wave shielding function, or a combination thereof.

According to a further aspect of the present invention, there is provided a display device including a panel assembly having a transparent front substrate and a rear substrate disposed to face each other, and a plurality of cells between the front substrate and the rear substrate, and a display filter facing the front substrate of the panel assembly.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
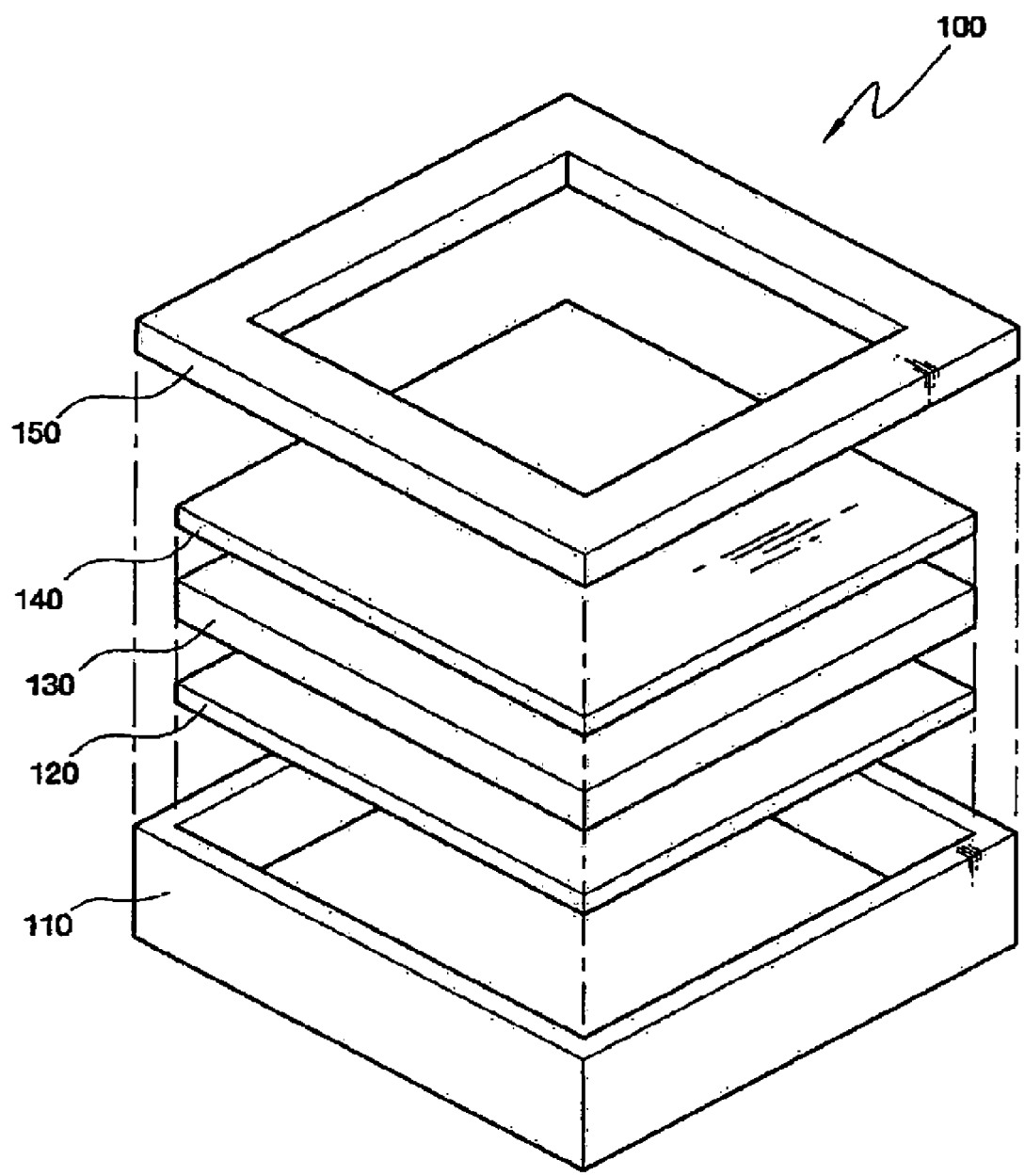
FIG. 1 is an exploded perspective view illustrating a plasma display panel (PDP) device according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein; rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention can be applied to a wide variety of displays including large-size displays such as plasma display panels (PDPs) realizing RGB color display using matrix pattern pixels, organic light emitting diode displays (OLEDs), liquid crystal displays (LCDs), or field emission displays (FEDs), small-size displays such as personal digital assistants PDAs, small game device display windows or mobile phone display windows, flexible displays, and so on. In particular, the present invention can be effectively used for both displays installed in public facilities for indoor applications and displays for outdoor applications having high external light. While a PDP and a PDP filter will be illustrated hereinafter by way of example, it will be understood by one skilled in the art that the present invention can also be applied to the above-referenced displays and filters for use therein.

Light-shielding patterns used in the present inventions are patterns for blocking light of external environments from coming into a matrix on which the same is installed and may be, for example, black stripes, black matrices, or black waves. The light-shielding patterns formed on a predetermined matrix may have a wedge-type or flat-type profile.

PDP filters according to embodiments of the present invention and PDPs including the same will now be described with reference to the accompanying drawings.

FIG. 1 is an exploded perspective view illustrating a plasma display panel (PDP) 100 according to an embodiment of the present invention. Referring to FIG. 1, the PDP 100 includes a case 110, a cover 150 covering an upper surface of the case 110, a driving circuit board 120 received in the case 110, a panel assembly 130 including discharge cells (not shown) in which a gas discharge occurs, and a PDP filter 140. The PDP filter 140 includes a conductive layer (not shown) made of a material with good conductivity on a transparent substrate (not shown). The conductive layer is grounded to the case 110 via the cover 150; that is, an EM radiation generated from the panel assembly 130, before it reaches a viewer, is grounded to the cover 150 and the case 110 through the conductive layer of the PDP filter 140.

Hereinafter, the PDP filter 140 shielding an EM radiation, NIR emission, external light, etc., will first be described, and a PDP 100 including the PDP filter 140 and the panel assembly 130 will then be described.

Figure 2:
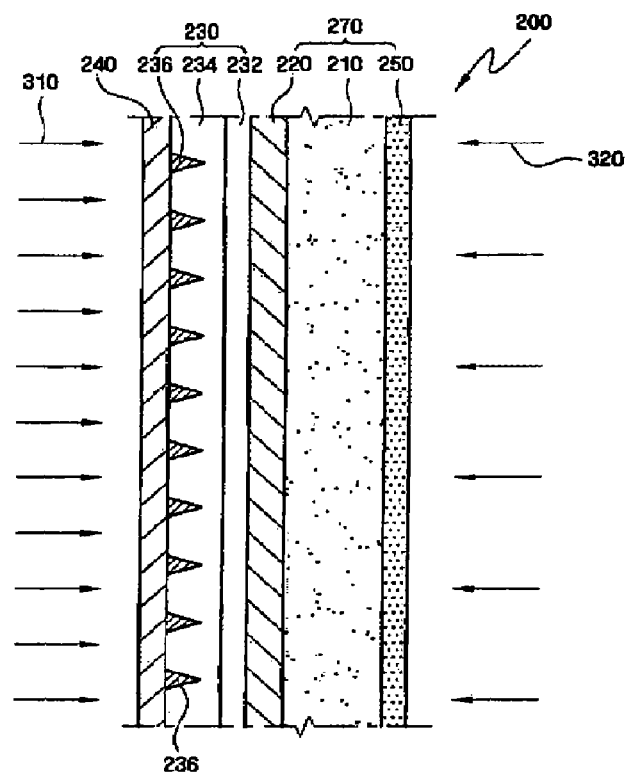
FIG. 2 is a sectional view illustrating a PDP filter according to an embodiment of the present invention.
Figure 3:
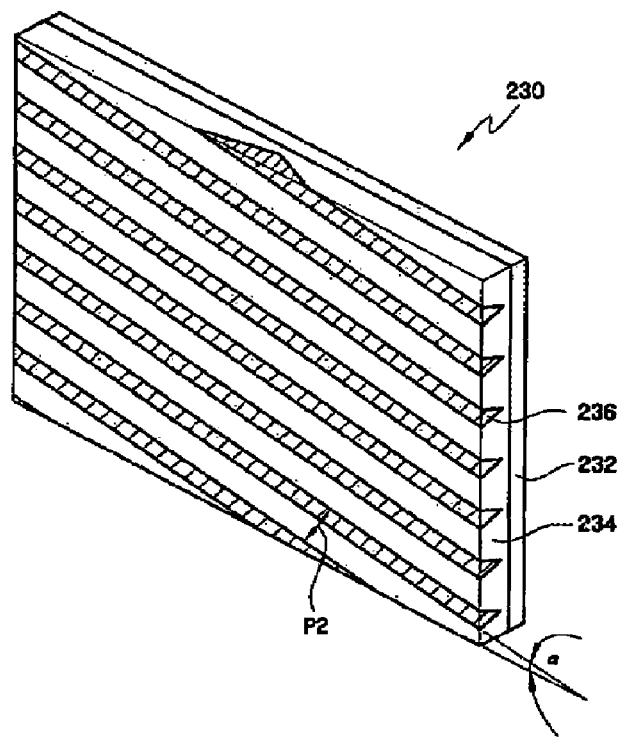
FIG. 3 is an enlarged sectional view of an external light-shielding layer used in the PDP filter shown in FIG. 2.

FIG. 2 is a sectional view illustrating a PDP filter 200 according to an embodiment of the present invention, and FIG. 3 is an enlarged sectional view of an external light-shielding layer used in the PDP filter 200 shown in FIG. 2.

Referring to FIGS. 2 and 3, the PDP filter 200 includes a filter base 270 including a transparent substrate 210 and various functional layers disposed on the transparent substrate 210, and an external light-shielding layer 230.

Here, the filter base 270 includes the transparent substrate 210, an antireflective layer 250 disposed on a surface of the transparent substrate 210, and an EM radiation-shielding layer 220 disposed on the other surface of the transparent substrate 210. The stacking sequence of the transparent substrate 210, the antireflective layer 250, and the EM radiation-shielding layer 220, however, may vary. While the current embodiment of the present invention has illustrated that an EM radiation-shielding layer and an antireflective layer are separately formed, the present invention is not limited thereto; that is, the filter base 270 may be comprised of one or more layers, and each layer may have an EM radiation-shielding function, an antireflection (AR) function, or a combination thereof.

The filter base 270 may have both an EM radiation-shielding function and an antireflection (AR) function as described above, but it may also have only one of either an EM radiation-shielding function or an antireflection (AR) function.

The external light-shielding layer 230 is disposed on one surface of the filter base 270. According to the embodiment shown in FIG. 2, the external light-shielding layer 230 is disposed on a surface of the filter base 270 opposing the panel assembly 130, that is, disposed opposite to a viewer position when the PDP filter 200 is installed in a PDP (not shown). Alternatively, the external light-shielding layer 230 may also be disposed on the other surface of the filter base 270. In this case, the same functions and effects can be obtained as the case where the external light-shielding layer 230 is disposed on one surface of the filter base 270.

Referring to FIGS. 2 and 3, the external light-shielding layer 230 includes a support 232, a matrix 234 disposed on a surface of the support 232, and a plurality of light-shielding patterns 236 with wedge-shaped black stripes, disposed in the matrix 234, preventing an entrance of external light into the panel assembly. In the illustrative embodiment, the plurality of light-shielding patterns 236 are formed on the transparent resin matrix and spaced apart from each other layer in a predetermined interval.

Here, the matrix 234 with the light-shielding patterns 236 may be directly disposed on the filter base 270. As shown in FIG. 2, however, the matrix 234 may also be disposed on the filter base 270 via the support 232. The support 232 supports the matrix 234 with the light-shielding patterns 236. While the embodiment of FIG. 2 has illustrated that the matrix 234 is attached to a surface of the filter base 270 via the support 232, the present invention is not limited thereto, and considering that the support 232 is used to support the matrix 234, the matrix 234 may also be directly attached to the filter base 270 when the external light-shielding layer 230 is disposed on the other surface of the filter base 270.

According to an embodiment of the present invention, the support 232 may be a transparent resin film that is transparent to UV light, e.g., polyethylene terephthalate (PET), polycarbonate (PC), or polyvinylchloride (PVC). Alternatively, the support 232 may be a layer having an intrinsic filter characteristic, such as the antireflective layer 250, a color correcting layer 240, or the EM radiation-shielding layer 220.

The light-shielding patterns 236 have wedge-shaped profiles, and are arranged at one surface of the transparent resin matrix 234 opposing a panel assembly (not shown) and spaced apart from each other layer in a predetermined interval, to prevent light of external environments from coming into the panel assembly.

The matrix 234 may be made of a UV-curable resin, and the light-shielding patterns 236 may be made of a light-absorbing material such as a black inorganic material and/or organic material or a metal. In particular, in the case of using a metal with high electric conductivity, i.e., low electric resistance, the light-shielding patterns 236 may include metal powder. In this case, because electric resistance can be controlled by adjusting a concentration of the metal powder, the light-shielding patterns 236 having an EM radiation-shielding function can be obtained. Furthermore, in the case of using a surface-blackened metal or a black metal, the light-shielding patterns 236 can efficiently realize external light- and EM radiation-shielding effects. The light-shielding patterns 236 may also be made of a carbon-containing UV-curable resin.

A formation method of the light-shielding patterns 236 in the present invention does not need to be particularly restricted, but may be accomplished by a thermal pressing method in which a thermoplastic resin is used, or an extrusion molding method in which a thermoplastic or thermocurable resin is filled into the matrix 234 having patterns opposing the light-shielding patterns 236 transferred thereto and then molded. Additionally, when the UV-curable resin forming the matrix 234 has an antireflection (AR) shielding function, an EM radiation shielding function, a color adjusting function, or a combination thereof, the external light-shielding layer 230 may also perform these functions.

The light-shielding patterns 236, which form the external light-shielding layer 230, absorb external light 320 and prevent the same from coming into the panel assembly or totally reflect incident light 310 from the panel assembly toward a viewer. Thus, a higher visible light transmittance and contrast ratio can be obtained.

Generally, a PDP is required to have a high visible light transmittance and a high contrast ratio. The contrast ratio of a PDP can be represented by Equation 1 below:

$$\text{Contrast ratio} = \frac{\text{Luminance of (white light + reflected light)}}{\text{Luminance of (black light + reflected light)}} \quad (1)$$

When all light beams emitted from a panel assembly are allowed to pass through a PDP filter to increase the transmittance of a PDP, the luminance of black light and the luminance of white light is increased. Thus, when the luminance of a PDP is increased, the contrast ratio is relatively decreased. A conventional PDP uses a PDP filter including a black colorant-containing color correction film to increase a contrast ratio with a sacrifice of a reduction in the transmittance of the PDP filter. To obtain a contrast ratio of 120:1 using such a conventional PDP, a visible light transmittance must be reduced to about 40.

The PDP filter 200 according to the present invention uses the light-shielding patterns 236 absorbing light instead of using a color correction film including a black colorant. Here, the light-shielding patterns 236 control the transmittance of visible light emitted from a panel assembly by partially absorbing the incident light 310 from the panel assembly, thereby increasing the contrast ratio of a PDP. According to Equation 1, the contrast ratio is a function of the luminance of reflected light. Here, the term "reflected light" comprehends the reflected light beam of the external light 320 which has entered into a panel assembly. The external light 320 may be directly absorbed into the light-shielding patterns 236 from a panel assembly. Otherwise, the external light 320 may be absorbed into the light-shielding patterns 236 from a panel assembly where light is totally reflected. Thus, the luminance of reflected light can be reduced. At this time, even if black light and white light produce the same reflected light, the contrast ratio is rapidly reduced due to the "luminance of reflected light" placed in the denominator of Equation 1.

When the ratio of the bottom portion area of the light-shielding patterns 236 to the surface area of the matrix 234 is 20 to 50%, a minimum transmittance loss and a maximum contrast ratio can be achieved. When the ratio of the bottom portion area of the light-shielding patterns 236 to the surface area of the matrix 234 is 25 to 35%, more advantage effects can be obtained. A PDP using the PDP filter 200 including the above-described external light-shielding layer 230 can achieve a contrast ratio of 250:1 or more while maintaining a visible light transmittance of 50% or greater.

Meanwhile, the external light-shielding layer 230 has a visible light transmittance of 70% or greater. The incident light 310 from the panel assembly is incident into the external light-shielding layer 230 nearly vertically with respect to the external light-shielding layer 230. Out of the incident light 310 from the panel assembly, some of the incident light 310 is absorbed into the light-shielding patterns 236, and most of the incident light 310 directly passes through the matrix 234 toward a viewer, thereby increasing the transmittance of a PDP.

Moiré fringes can be formed by periodic patterns of discharge cells of a panel assembly (see 600 of FIG. 4A) and periodic patterns of the light-shielding patterns 236 of the external light-shielding layer 230. The term "Moiré fringes" is simply used to denote interference fringes created when two or more periodic patterns are superimposed. To prevent such Moiré fringes, as shown in FIG. 3, the discharge cells and the light-shielding patterns 236 are alternately arranged such that an imaginary plane of the light-shielding patterns 236 and the longer side of the matrix 234 form a predetermined angle. Here, to prevent the Moiré fringes, a bias angle (α) defined by an intersection angle created between the imaginary plane of the light-shielding patterns 236 and the longer side of the matrix 234 is preferably in a range of about 5 to 80 degrees.

Optical measurement of Moiré fringes depending on a change in the bias angle (α) was carried out, and the result thereof is summarized in Table 1. A panel assembly (see 600 of FIG. 4A) having a pixel pitch (see P1 of FIG. 4A) of about 0.5-2.5 mm, using the external light-shielding layer 230 having the light-shielding patterns 236 shaped of black stripes having a pitch P2 of about 0.07-0.11 mm, was used to give 13 test samples each having a bias angle (α) of 0°, 4°, 5°, 10°, 20°, 35°, 40°, 50°, 60°, 70°, 80°, 90°, respectively. Then, it was examined to determine whether a Moiré phenomenon had occurred due to interference between pixels of the panel assembly (see 600 of FIG. 4A) and the light-shielding patterns 236 of the external light-shielding layer 230.

TABLE 1

| | | Pitch ad Spacing of Light-shielding pattern (μ)) | | |
|---|---|---|---|---|
| No. | Bias angle (°) | Pitch = 109 Spacing = 33 | Pitch = 108 Spacing = 30 | Pitch = 72 Spacing = 20 |
| 1 | 0 | x | x | x |
| 2 | 4 | x | o | o |
| 3 | 5 | o | o | o |
| 4 | 10 | o | o | o |
| 5 | 20 | o | o | o |
| 6 | 35 | o | o | o |
| 7 | 40 | o | o | o |
| 8 | 50 | o | o | o |
| 9 | 60 | o | o | o |
| 10 | 70 | o | o | o |
| 11 | 80 | o | o | o |
| 12 | 81 | x | x | o |
| 13 | 90 | x | x | o |

(o: No Moiré phenomenon occurred; x; Moiré phenomenon occurred)

As illustrated in Table 1, occurrence of a Moiré phenomenon can be determined according to changes in the pitch and spacing of the light-shielding patterns 236. As evident from Table 1, when the bias angle (α) is in a range of about 5 to 800, no Moiré phenomenon occurred irrespective of changes in the pitch and spacing of the light-shielding patterns 236. Further, it was confirmed that when the bias angle (α) is in a range of about 5 to 10°, occurrence of a Moiré phenomenon could be more effectively prevented.

The Moiré phenomenon due to interference between the panel assembly and the light-shielding patterns 236 can be prevented by adjusting the pixel pitches P1 and P2 of the light-shielding patterns 236. It is quite difficult however to accurately control the pixel pitches P1 and P2. Thus, to prevent more effectively a Moiré phenomenon, the light-shielding patterns 236 of the external light-shielding layer 230 may be arranged in the panel assembly (see 600 of FIG. 4A) at a predetermined bias angle (α).

Turning to FIG. 2, the filter base 270 includes the EM radiation-shielding layer 220 disposed on a surface of the transparent substrate 210 and the antireflective layer 250 disposed on the other surface of the transparent substrate 210. The present invention is not limited to the above-illustrated stacked structure, however, and the stacking sequence of the transparent substrate 210, the antireflective layer 250, and the EM radiation-shielding layer 220 may be diversely modified.

The transparent substrate 210 is generally formed to a thickness of 2.0 to 3.5 mm using a tempered or semi-tempered glass, or a transparent plastic material such as acryl. Glass has a specific gravity of 2.6 and, thus, increases the weight and thickness of a PDP filter. Therefore, when a glass substrate is installed in a PDP panel, the total weight of the PDP panel may increase. The glass substrate, however, guarantees the high level of safety against fracture. The transparent substrate 210 may be omitted according to the specification of the filter base 270.

The transparent substrate 210 may be made of an inorganic compound such as glass or quartz, or a transparent organic polymer.

Examples of the transparent organic polymer include acryl and polycarbonate, but the present invention is not limited to the above-illustrated examples. The transparent substrate 210 may have high transparency and heat resistance. A polymer structure or a stacked polymer structure can be used as the transparent substrate 210. The transparent substrate 210 may have a high transparency of visible light transmittance of 80% or greater, and a good heat resistance of a glass transition temperature of 50° C. or higher. The polymer foam material may be any transparent material in the visible wavelength range and specific examples thereof include, but are not limited to, polyethylene terephthalate (PET), polysulfone (PS), polyether sulfone (PES), polystyrene, polyethylene naphthalate, polyarylate, polyether etherketone (PEEK), polycarbonate (PC), polypropylene (PP), polyimide, triacetylcellulose (TAC), and polymethylmethacrylate (PMMA). PET is more preferred in view of price, heat resistance, and transparency.

To shield an EM radiation, it is necessary to cover a surface of a display with a highly conductive structure. Thus, the EM radiation-shielding layer 220 may be a multilayered transparent conductive film obtained by stacking a conductive mesh film or a metal film and a higher refractive index transparent film. The embodiment of FIG. 2 illustrates that the EM radiation-shielding layer 220 is disposed on the surface of the transparent substrate 210, i.e., on a panel assembly side, but the present invention is not limited thereto.

Here, the conductive mesh film may be a grounded metal mesh film, or a metal-coated, synthetic resin or metal fiber mesh film. Examples of the useful conductive mesh film include any metallic material having good electric conductivity and workability, such as copper, chromium, nickel, silver, molybdenum, tungsten, or aluminum.

The higher refractive index transparent film of the multilayered transparent conductive film may be made of indium tin oxide (ITO) to shield an EM radiation. The multilayered transparent conductive film may be an alternately stacked structure of a metal film made of gold, silver, copper, platinum, or palladium, and a higher refractive index transparent film made of indium oxide, stannic oxide, or zinc oxide.

The metal film of the multilayered transparent conductive film may be made of silver (Ag) or silver alloy. Silver offers good conductivity, infrared ray reflection, and visible light transmittance in a stacked structure. Silver is unstable chemically and physically, however, and is easily degraded by an environmental factor such as contaminants, water vapor, heat, or light. Thus, a silver alloy containing at least one stable metal selected from gold, platinum, palladium, copper, indium, or tin may be used.

The higher refractive index transparent film of the multilayered transparent conductive film permits the transmission of visible light and prevents the reflection of visible light by a refractive index difference between it and the metal film. For example, the higher refractive index transparent film may be made of oxide of metal such as indium, titanium, zirconium, bismuth, tin, zinc, antimony, tantalum, cerium, neodium, lanthanum, thorium, magnesium, potassium, or a combination thereof, or zinc sulfide.

Although not shown, the filter base 270 may further include a NIR-shielding layer. The NIR-shielding layer serves to shield strong NIR radiation from a panel assembly that may cause a malfunction of electronic machines such as wireless telephones or remote controllers.

The multilayered transparent conductive film used as the EM radiation-shielding layer 220 also has a NIR-shielding effect. Thus, both NIR and EM radiation can be shielded by only the EM radiation-shielding layer 220 with no separate NIR-shielding layer. Of course, in this case, a NIR-shielding layer can be formed separately.

In an exemplary embodiment, a conductive mesh film may also be used as the EM radiation-shielding layer 220. In this case, a polymer resin containing a NIR-absorbing colorant capable of absorbing NIR wavelengths may be used to shield NIR radiation from a panel assembly. For example, the NIR-absorbing colorant may be an organic colorant selected from cyanines, anthraquinones, naphthoquinones, phthalocyanines, naphthalocyanines, diimoniums, and nickel dithiol complexes. Generally, a PDP generates strong NIR over a broad wavelength range and, therefore, it is desired to use a NIR-shielding layer capable of absorbing NIR over a broad wavelength range.

In an exemplary embodiment, a transparent conductive film may also be used as the EM radiation-shielding layer 220. The transparent conductive film may show a lower EM radiation-shielding function than the above-described conductive mesh film, but the EM radiation-shielding function can be supplemented or reinforced by the addition of metal powder to the light-shielding patterns 236.

In the embodiment of FIG. 2, the antireflective layer 250 is disposed on the opposite surface of the transparent substrate 210 to the EM. radiation-shielding layer 220. The present invention, however, is not limited to the above-illustrated stacking sequence of the EM radiation-shielding layer 220, the transparent substrate 210, and the antireflective layer 250. Preferably, as shown in FIG. 2, the antireflective layer 250 is formed at the viewer's side of a PDP including the PDP filter 200, at an opposite side to the panel assembly. The antireflective layer 250 reduces the reflection of external light, thereby improving visibility.

The antireflective layer 250 may also be further formed at the side of the panel assembly of the PDP filter 200 to more efficiently reduce the reflection of external light. The reduction of the reflection of external light by the antireflective layer 250 can enhance the transmittance of visible light emitted from a panel assembly and increase a contrast ratio. Referring back to FIG. 2, the PDP filter 200 may further include a color correction layer 240 having a transmittance of 60% or greater at a wavelength range of 580-600 nm. The color correction layer 240 changes or corrects a color balance by reducing or adjusting the intensities of red (R), green (G), and blue (B).

Generally, red visible light emitted from plasma in a panel assembly appears as orange light. A conventional color correction layer performs color correction from orange having a wavelength range of 580-600 nm to red. The color correction layer 240, however, has a transmittance of 60% or greater for orange color having a wavelength range of 580-600 nm and, thus, can reduce or exclude color correction from orange to red.

The reason for strong orange light radiation from a panel assembly is because light emitted from plasma and reflected light beam of external light transmitted through a panel assembly appear as an orange color. In the PDP filter 200 of the present invention, the external light-shielding layer 230 prevents the entrance of the external light 320 into a panel assembly, resulting in a fundamental reduction of the incident light 310 emitted as orange light. Thus, the PDP filter 200 can enhance color purity with no or less use of a colorant for orange color correction. For example, when color coordinates were measured using RGB colors at a bright room (150 lux) for the middle of the IRE scale (50 IRE), the ratio of the area of the measured color coordinates to the area of intrinsic color coordinates at a panel assembly with no the PDP filter 200 was 66%, whereas that at a panel assembly with the PDP filter 200 was 86%. This reveals that the PDP filter 200 of the present invention provides high color purity.

The color correction layer 240 uses various colorants to increase the color reproduction range of a display and to enhance screen sharpness. The colorant may be a dye or a pigment. The colorant may be an organic colorant having a neon light-shielding function such as anthraquinone, cyanine, azos, stilbene, phthalocyanine, and methine, but the present invention is not limited thereto. The type and concentration of the colorant are not particularly defined herein since they are determined by an absorption wavelength, an absorption coefficient, and transmission characteristics required by a particular display.

The layers or films constituting the PDP filter 200 can be attached to each other by a transparent adhesive or bond. Specific examples of the adhesive agents include acryl, silicone, polyvinylbutyral, ethylenevinylacetate, polyvinylether, saturated amorphous polyester, melamine resin, and the like.

The thus-formed PDP filter 200 has a visible light transmittance of 50% or greater and a contrast ratio of 250:1 or more in a bright room. Additionally, a Moiré phenomenon can be effectively prevented by arranging the PDP filter 200 at a predetermined bias angle (α) with respect to the light-shielding patterns 236 and the longer side of the matrix 234. Hitherto, the PDP filter 200 has been illustrated; hereinafter, a PDP including the PDP filter 200 will be described with reference to FIGS. 4A and 4B.

Figure 4A:
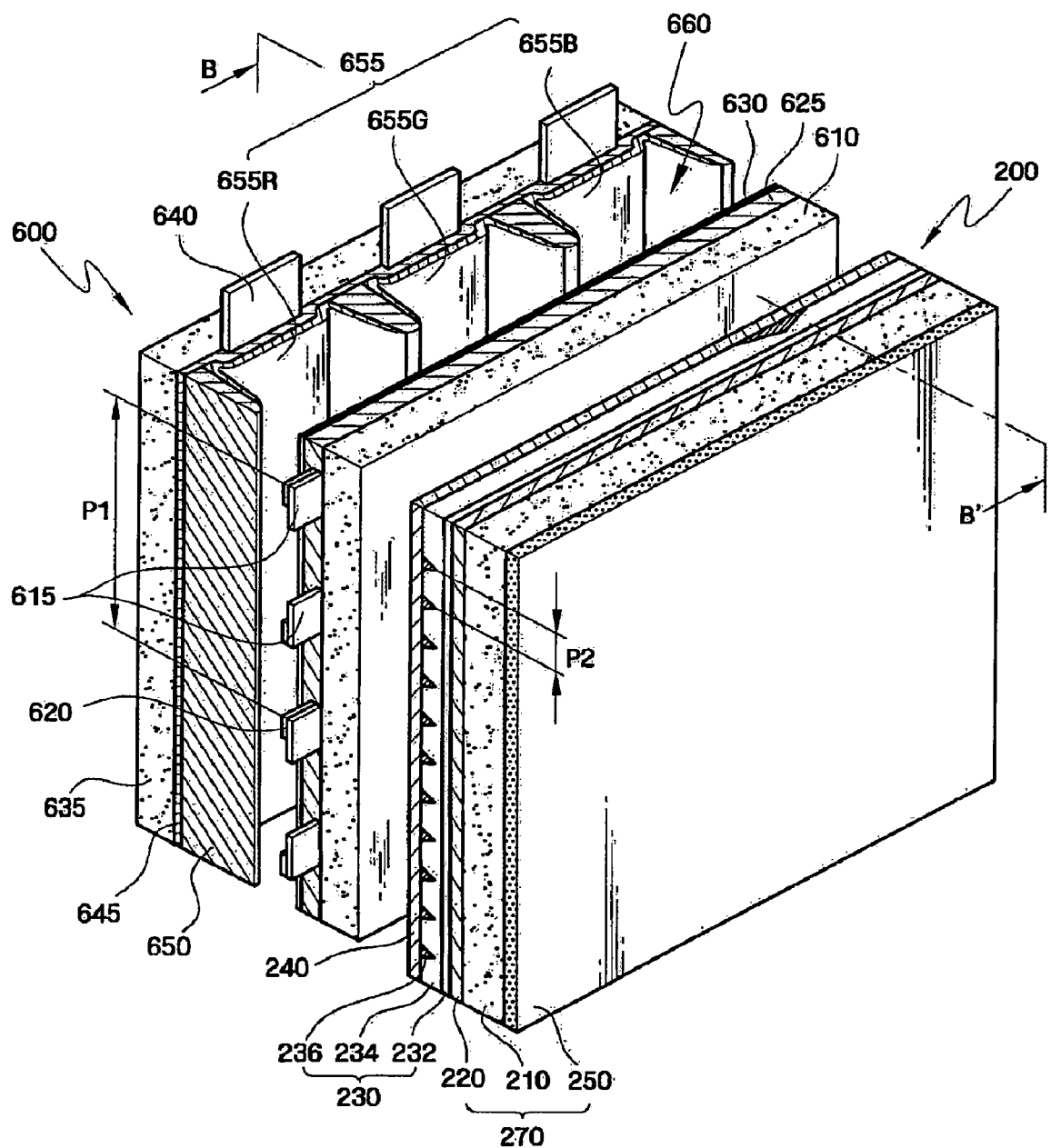
FIG. 4A is an exploded perspective view illustrating a PDP according to an embodiment of the present invention.
Figure 4B:
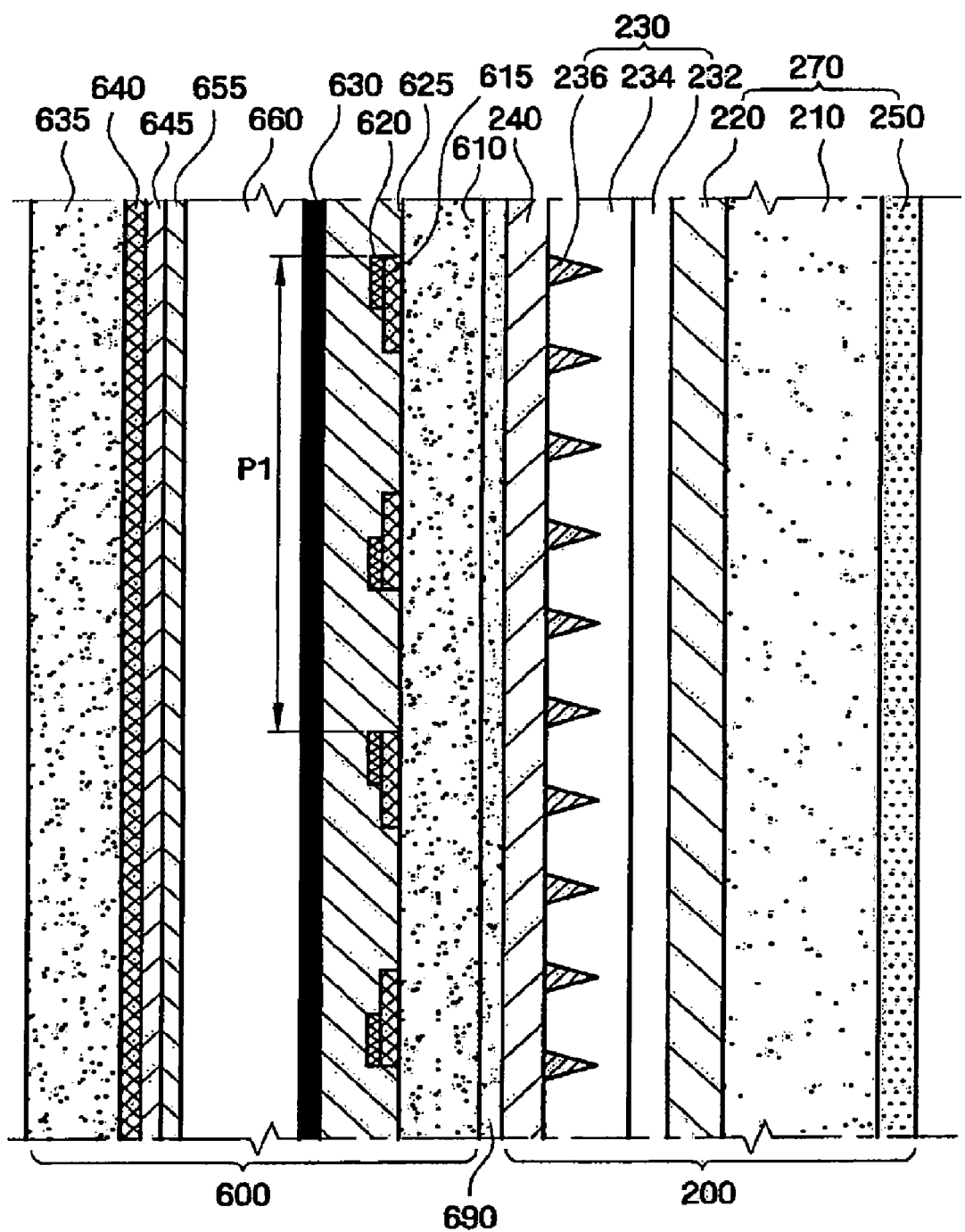
FIG. 4B is a sectional view taken along a line B-B' shown in FIG. 4A.

FIG. 4A is an exploded perspective view illustrating a PDP according to an embodiment of the present invention, and FIG. 4B is a sectional view taken along a line B-B' shown in FIG. 4A.

Referring to FIGS. 4A and 4B, a PDP includes a PDP filter 200 and a panel assembly 600. The PDP filter 200 is as described above and, thus, a detailed description thereof will be omitted. Hereinafter, the panel assembly 600 will be described in detail.

Referring to FIG. 4A, a plurality of sustain electrode pairs 615 are disposed in a striped pattern on a surface of a front substrate 610. Each sustain electrode includes a bus electrode 620 to reduce a signal delay. The sustain electrode pairs 615 are entirely covered with a dielectric layer 625. A dielectric protective layer 630 is disposed on the dielectric layer 625. According to an embodiment of the present invention, the dielectric protective layer 630 is formed by covering the dielectric layer 625 with MgO by sputtering, etc.

Meanwhile, a plurality of address electrodes 640 are formed in a striped pattern on a surface of a rear substrate 635 opposing the front substrate 610. The address electrodes 640 are formed to intersect with the sustain electrode pairs 615 so that the front substrate 610 and the rear substrate 635 face each other. The address electrodes 640 are entirely covered with a dielectric layer 645. A plurality of partition walls 650 are disposed on the dielectric layer 645 in such a way to be parallel to the address electrodes 640 and project toward the front substrate 610. The partition walls 650 are disposed between two adjacent address electrodes 640.

A phosphor layer 655 is disposed on inside surfaces of grooves defined by the partition walls 650 and the dielectric layer 645. The red phosphor layer 655R, the green phosphor layer 655G, and the blue phosphor layer 655B are respectively formed using red, green, and blue phosphor particles by a thick film formation method such as a screen printing method, an inkjet method, or a photoresist film method. For example, the phosphor layer 655 consisting of the red phosphor layer 655R, the green phosphor layer 655G, and the blue phosphor layer 655B may be made of (Y, Gd)BO$_3$:Eu, Zn$_2$SiO$_4$:Mn, and BaMgAl$_{10}$O$_{17}$:Eu, respectively.

Discharge cells 660, which are defined by the grooves and the dielectric protective layer 630 when the front substrate 610 and the rear substrate 635 are coupled with each other, are filled with a discharge gas. Thus, the discharge cells 660 of the panel assembly 600 are formed at intersections between the sustain electrode pairs 615 of the front substrate 610 and the address electrodes 640 of the rear substrate 635. For example, the discharge gas may be a Ne—Xe gas, a He—Xe gas, etc.

The panel assembly 600 with the above-described structure emits light according to substantially the same principle as a fluorescent lamp. UV light emitted from the discharge gas of the discharge cells 660 excites the phosphor layer 655 to emit visible light.

The red phosphor layer 655R, the green phosphor layer 655G, and the blue phosphor layer 655B are made of phosphor materials having different visible light conversion efficiencies. Thus, a color balance adjustment for image display in the panel assembly 600 is generally performed by adjusting the luminance of the red phosphor layer 655R, the green phosphor layer 655G, and the blue phosphor layer 655B. In detail, based on the phosphor layer with the lowest luminance, the luminance of the other phosphor layers is lowered according to a predetermined ratio.

The driving of the panel assembly 600 is generally classified into driving for address discharge and sustain discharge. The address discharge occurs between the address electrodes 640 and one electrode of the sustain electrode pairs 615. At this time, wall charges are generated. The sustain discharge occurs due to a potential difference between sustain electrode pairs positioned in the discharge cells 660 in which wall charges are generated. During the sustain discharge, the phosphor layer 655 of the discharge cells 660 in which wall charges are generated is excited by UV light emitted from a discharge gas, and the phosphor layer 655 emits visible light. The visible light creates visually recognizable images while passing through the front substrate 610.

A relationship between the panel assembly 600 and the PDP filter 200 will now be described with reference to FIG. 4B.

Referring to FIG. 4B, the PDP filter 200 is disposed on the front substrate 610 of the panel assembly 600. The PDP filter 200 may be separated from the front substrate 610 of the panel assembly 600, as shown in FIG. 4A. The PDP filter 200 may also be brought into contact with the front substrate 610 of the panel assembly 600.

To avoid side effects, e.g., light of external environments coming into a region between the panel assembly 600 and the PDP filter 200 or to reinforce the strength of the PDP filter 200, the PDP filter 200 may be attached to the front substrate 610 of the panel assembly 600 via an adhesive or bond 690, as shown in FIG. 4B.

To prevent the light of external environments from coming into the panel assembly 600, an external light-shielding layer 230 may be provided in the PDP filter 200. The light of external environments, which is mainly absorbed by the external light-shielding layer 230 and transmitted through the front substrate 610, can be prevented from being reflected back to the external environments. Therefore, the contrast ratio of a PDP in a bright room condition can be enhanced.

The pitch P2 between the light-shielding patterns 236 may be smaller than the pitch P1 between the discharge cells (or pixels) of the panel assembly 600; that is, when two or more of the black stripes correspond to a unit cell of the discharge cells 660, incident light from the panel assembly 600 can be uniformly distributed and external light can be efficiently absorbed.

Moiré fringes can be formed by the periodic patterns of the discharge cells 660 of the panel assembly 600 and the periodic patterns of the light-shielding patterns 236 of the external light-shielding layer 230. The term "Moiré fringes" is simply used to denote interference fringes created when two or more periodic patterns are superimposed. To prevent such Moiré fringes, the pitch P2 of the light-shielding patterns 236 may be in a range of about 70 to about 110 μm. Here, the pixel pitch P2 of the panel assembly 600 may be in a range of about 0.5 to about 2.5 mm.

In the above-described embodiment, while the external light-shielding layer 230 having the light-shielding patterns 236 has been described by way of example, the invention is not limited thereto, and various types of external light-shielding layers shown in FIGS. 5A through 5H may be applied to the invention. FIGS. 5A through 5H are sectional views illustrating modified examples of external light-shielding layers according to the present invention.

As shown in FIGS. 5A through 5H, the external light-shielding layers 430a, 430b, 430c, 430d, and 430e absorb external light using various types of light-shielding patterns 436a, 436b, 436c, 436d, and 436e to prevent the external light from coming into a panel assembly and to reflect the external light from the panel assembly to a viewer's side, thereby enhancing the transmittance of visible light and obtaining a high contrast ratio. Examples of the light-shielding patterns include a wedge-black matrix-type light-shielding pattern 436a shown in FIG. 5A, a wedge-black wave-type light-shielding pattern 436b shown in FIG. 5B, a flat-black stripe-type light-shielding pattern 436c shown in FIG. 5C, a flat-black matrix-type light-shielding pattern 436d shown in FIG. 5D, a flat-black wave-type light-shielding pattern 436e shown in FIG. 5E, and so on. To avoid a Moiré phenomenon, the light-shielding patterns 436a, 436b, 436c, 436d, and 436e may be formed at a bias angle (α) in a range of about 5-80° with respect to the longer side of the matrix 234.

Figure 5A:
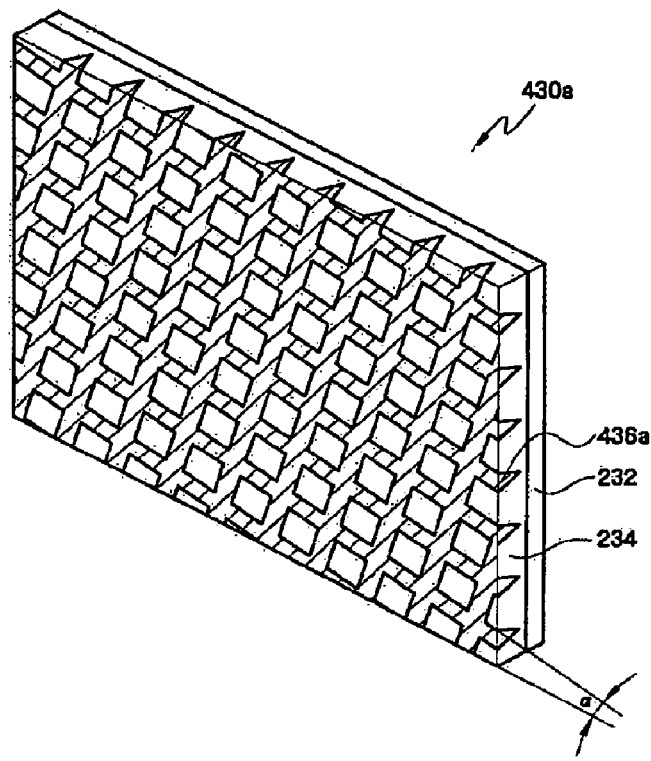
FIGS. 5A through 5H are sectional views illustrating modified examples of external light-shielding layers according to the present invention.
Figure 5B:
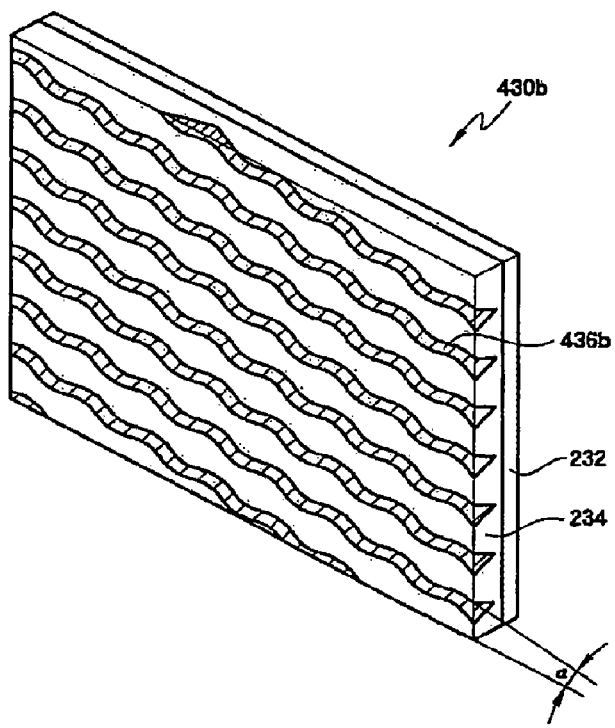
Figure 5C:
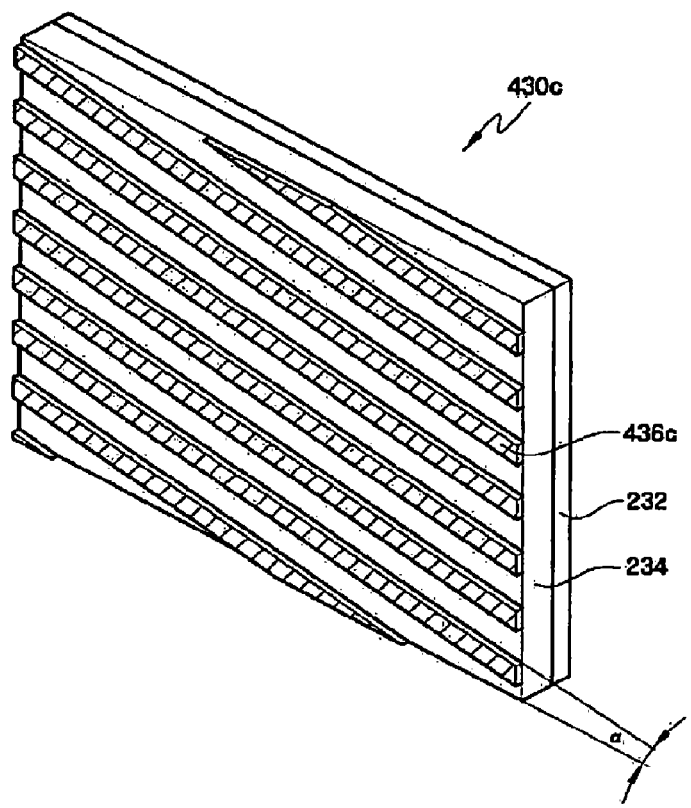
Figure 5D:
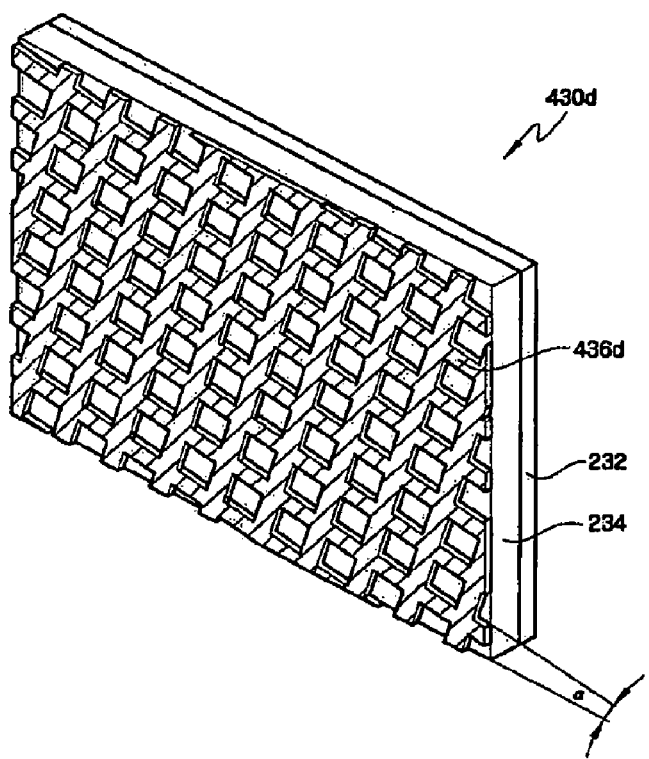
Figure 5E:
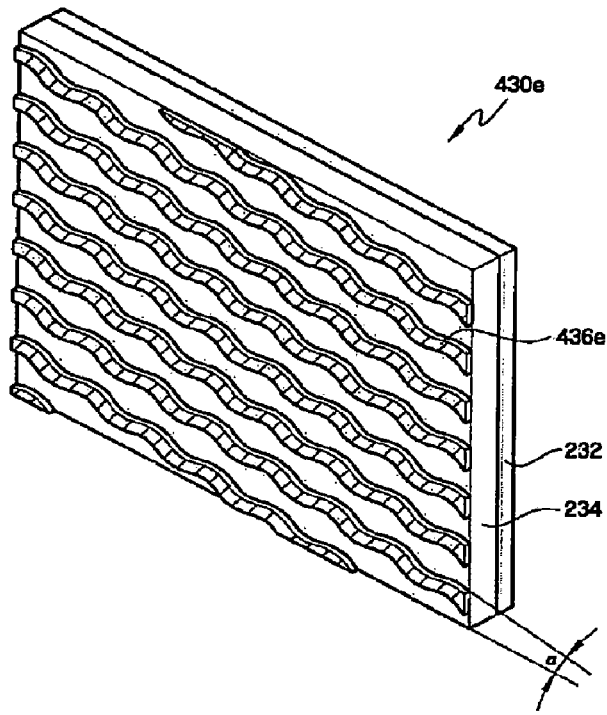
Figure 5F:
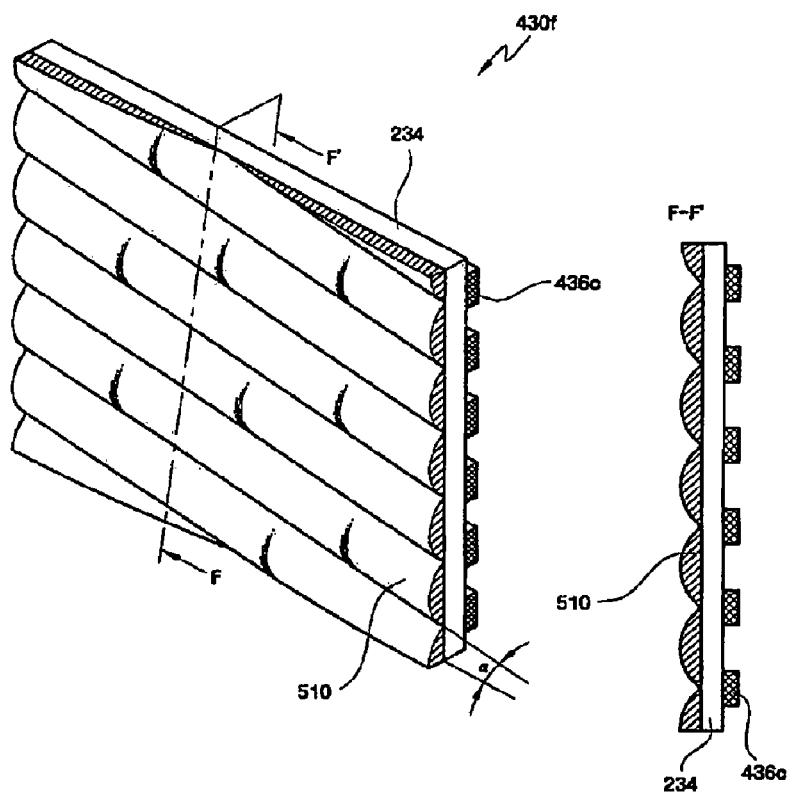
Figure 5G:
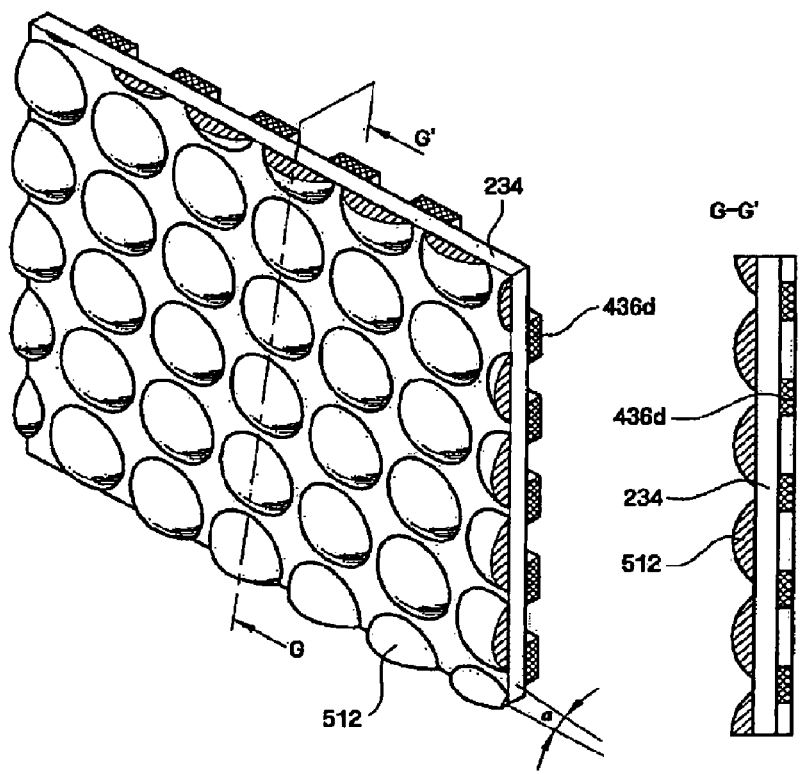
Figure 5H:
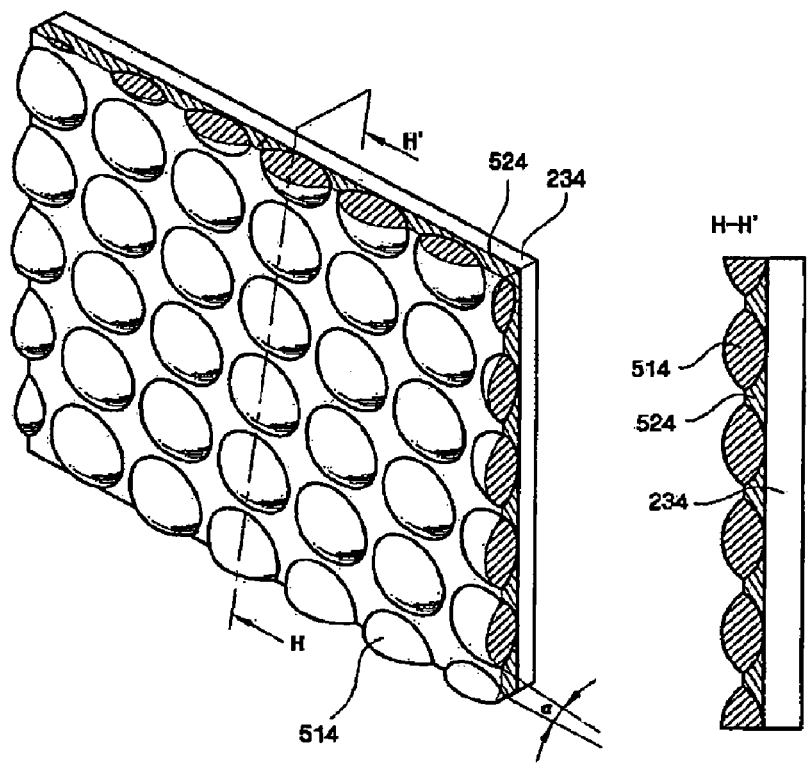

The light-shielding layers 430f, 430g, and 430h shown in FIGS. 5F and 5H prevent external light and effectively focus incident light entering from the panel assembly to a viewer's side, thereby achieving higher transmittance and contrast ratio.

More specifically, the external light-shielding layer 430f shown in FIG. 5F include a matrix 234, a plurality of hemi-cylindrical lenticular lenses 510 formed on one plane of a panel assembly in the matrix 234 and focusing incident light, and flat-black stripe-type light-shielding patterns 436c formed on the other plane of the matrix 234 shielding the external light. The external light-shielding layer 430g shown in FIG. 5G includes a matrix 234, a plurality of hemi-spherical lenticular lenses 512 formed on one plane of a panel assembly in the matrix 234 and focusing incident light, and flat-black matrix-type light-shielding patterns 436d formed on the other plane of the matrix 234 shielding the external light. The external light-shielding layer 430h shown in FIG. 5H includes a matrix 234, a plurality of elliptical bead lenses 514 formed on one plane of a panel assembly in the matrix 234 and focusing incident light, and light-shielding patterns 524 sandwiched between the matrix 234 and each of the plurality of elliptical bead lenses 514 blocking the external light.

Here, the light-shielding patterns 524 shown in FIG. 5H are made of the same material as and perform the same functions as that of the light-shielding patterns 236 shown in FIG. 2. Additionally, the light-shielding patterns 524 have periodic patterns by bead lenses 514 arrayed at regular intervals. The lenticular lenses 510 and 512 and the bead lenses 514 may be of a transparent material having high light transmittance, e.g., 70% or more. For example, the transparent material may be made of glass or transparent resin, or a neon light and/or NIR shielding material.

Therefore, to prevent a Moiré phenomenon due to periodic patterns of the discharge cells 660 of the panel assembly 600 periodic patterns of the external light-shielding layers 430f, 430g, and 430h, the light-shielding patterns 436c, 436d, and 524 may be formed at a bias angle ($\alpha$) in a range of about 5-80° with respect to the longer side of the matrix 234.

For brevity, the present invention will be described with reference to the wedge-black stripe-type light-shielding patterns 236 by way of example.

Figure 6:
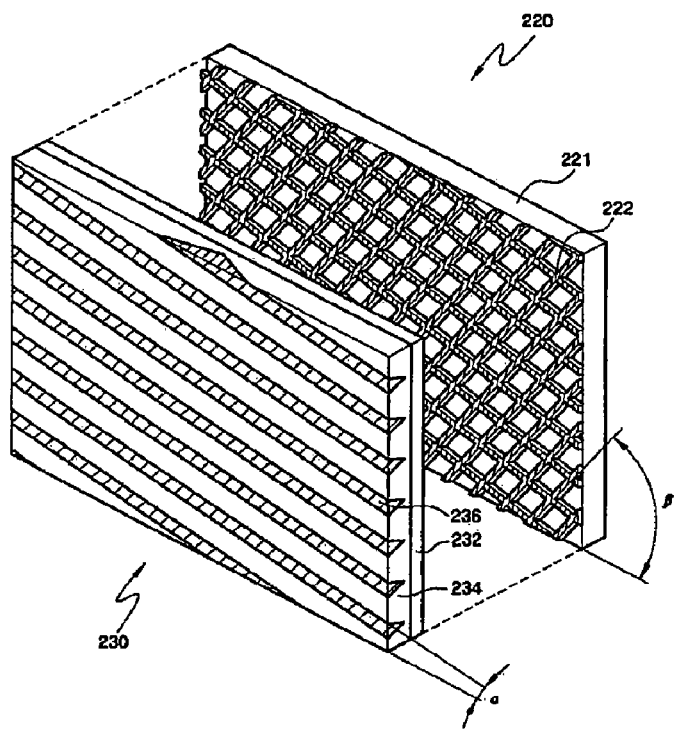
FIG. 6 is an exploded perspective view illustrating an external light-shielding layer and an EM radiation shielding layer separated from a PDP filter shown in FIG. 2.

In general, when two or more periodic patterns are superimposed, interference fringes, such as Moiré fringes, may be created. In this regard, a PDP filter capable of preventing a Moiré phenomenon that may occur between an external light-shielding layer and an EM radiation shielding layer will be described in greater detail with reference to FIG. 6. FIG. 6 is an exploded perspective view illustrating an external light-shielding layer and an EM radiation shielding layer separated from a PDP filter shown in FIG. 2. In the following description, a wedge-black stripe is used as a light-shielding pattern and a conductive layer having a mesh pattern is used as EM radiation-shielding layer.

As described above, assuming that a pixel pitch of the panel assembly ranges from about 0.5 to 2.5 mm, the pitch of the light-shielding patterns 236 range from about 0.07 to 0.11 mm, and the bias angle of the light-shielding patterns 236 range from about 5 to 80 degrees, no Moiré phenomenon occurred between pixels and the light-shielding patterns 236. As shown in FIG. 6, to prevent a Moiré phenomenon from being created between the conductive mesh type EM radiation-shielding layer 220 and the external light-shielding layer 230, as shown in FIG. 6, it is preferable that the external light-shielding layer 230 be biased at an angle ($\beta$), i.e., a bias angle. Here, the bias angle ($\beta$) is defined by an intersection angle created between the imaginary plane of the mesh pattern and the longer side of the matrix 234; that is, the longer side of the panel assembly. Preferably, when a bias angle difference ($\beta-\alpha$) between the EM radiation-shielding layer 220 and the external light-shielding layer 230 is in a range of 5 to 40 degrees or 50 to 75 degrees, the Moiré phenomenon can be prevented. Further, when the bias angle difference ($\beta-\alpha$) between the EM radiation-shielding layer 220 and the external light-shielding layer 230 is in a range of 5 to 15 degrees or 55 to 65 degrees, the Moiré phenomenon can be more effectively prevented.

For example, Table 2 summarizes extents of Moiré phenomena depending on a change in the bias angle ($\beta$) of the external light-shielding layer 230. Assuming that a pixel pitch of a panel assembly ranges from about 0.5 to 2.5 mm, a mesh pitch ranges from about 0.25 to 0.35 mm, and a bias angle ($\alpha$) of the light-shielding patterns 236 is about 5 degrees, optical measurement of Moiré fringes was carried out on 5 sample groups each having a bias angle ($\beta$) set in a range of 0 to 9 degrees, 10 to 45 degrees, 46 to 54 degrees, 55 to 80 degree and 81 to s90 degrees.

TABLE 2

| No. | Bias angle ($\beta$)(°) | Moiré fringes |
| --- | --- | --- |
| 1 | 0-9 | Generated |
| 2 | 10-45 | Not generated |
| 3 | 46-54 | Generated |
| 4 | 55-80 | Not generated |
| 5 | 81-90 | Generated |

As confirmed from Table 2, a change in the bias angle ($\beta$) of the EM radiation-shielding layer 220 determines generation or non-generation of Moiré fringes; that is, when the bias angle ($\beta$) of the EM radiation-shielding layer 220 is in a range of about 10 to 45°, or about 55 to 80°, generation of Moiré fringes can be effectively prevented. Since the bias angle ($\alpha$) of the light-shielding patterns 236 is about 5 degrees, when the bias angle difference ($\beta-\alpha$) between the EM radiation-shielding layer 220 and the external light-shielding layer 230 is in a range of 5 to 40 degrees or 50 to 75 degrees, the Moiré phenomenon can be effectively prevented.

Figure 7A:
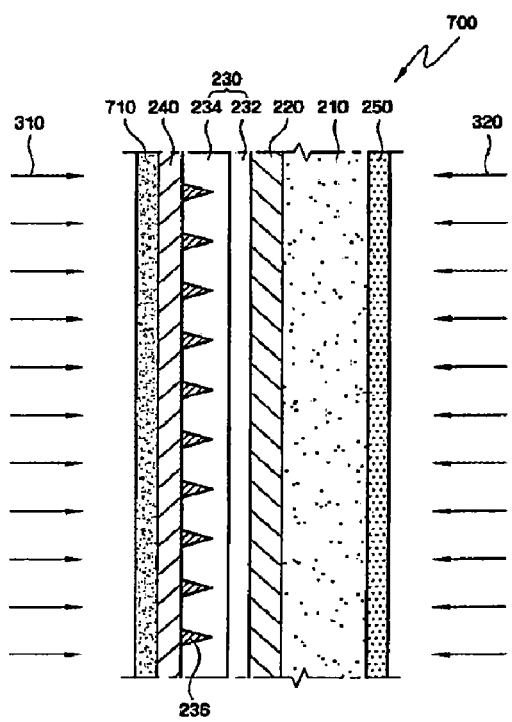
FIG. 7A is a sectional view illustrating a PDP filter according to another embodiment of the present invention.
Figure 7B:
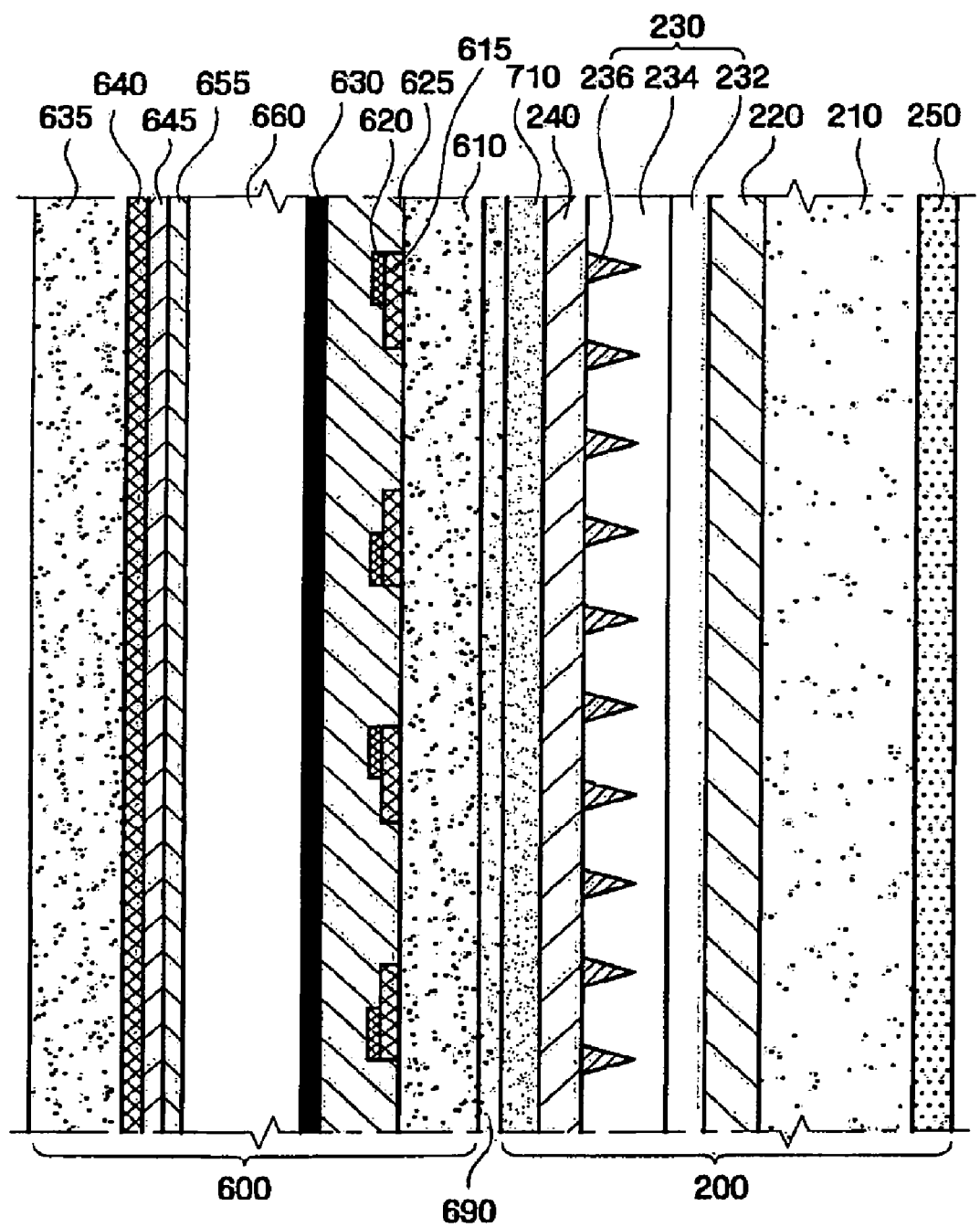
FIG. 7B is a sectional view illustrating a PDP including the PDP filter shown in FIG. 7A.

Hereinafter, a PDP filter according to another embodiment of the present invention will be described with reference to FIGS. 7A and 7B. FIG. 7A is a sectional view illustrating a PDP filter according to another embodiment of the present invention, and FIG. 7B is a sectional view illustrating a PDP including the PDP filter shown in FIG. 7A. For the sake of clarity and ease of explanation, components each having the same function in all the drawings for describing the previous embodiment are respectively identified by the same reference numerals, and their repetitive description will be omitted.

Referring to FIGS. 7A and 7B, a PDP filter 700 has substantially the same structure as the PDP filter 200 according to the previous embodiment, except that a diffusion layer 710 is used to prevent Moiré fringes and a Newton ring phenomenon. When periodic patterns such as light-shielding patterns of light-shielding patterns 236 of an external light-shielding layer 230 or the mesh pattern of an EM radiation-shielding layer 220 are reflected at a front substrate 610 of a panel assembly 600, Moiré fringes may be generated by interference between the original pattern and the reflected light pattern. When a distance between the PDP filter 700 and the front substrate 610 of the panel assembly 600 is not uniformly maintained, the Newton ring phenomenon may occur. The diffusion layer 710 diffuses the reflected light pattern so that the interference between the original pattern and the reflected light pattern does not occur, thereby preventing Moiré fringes and the Newton ring phenomenon. The diffusion layer 710 may be positioned on a surface of the PDP filter 700 closer to the panel assembly 600, but the position of the diffusion layer 710 can be changed as long as the Moiré fringes and Newton ring phenomenon can be prevented; that is, the diffusion layer 710 may also be disposed on the viewer's side of the PDP filter 700, i.e., on an antireflective layer 250.

The diffusion layer 710 may be an anti-glare treatment film. Here, the "anti-glare treatment" refers to the formation of a fine concave-convex structure on a surface of a film using an appropriate method, such as a rough surfacing treatment method, e.g., sandblasting or embossing, or a method of combining transparent microparticles. Examples of suitable transparent particles having a particle size of 0.1 to 5 mm include silica, alumina, titania, zirconia, inorganic conductive particles such as tin oxide, indium oxide, cadmium oxide or antimony oxide, organic conductive particles such as crosslinked or noncross-linked polymers, and so on.

Figure 8:
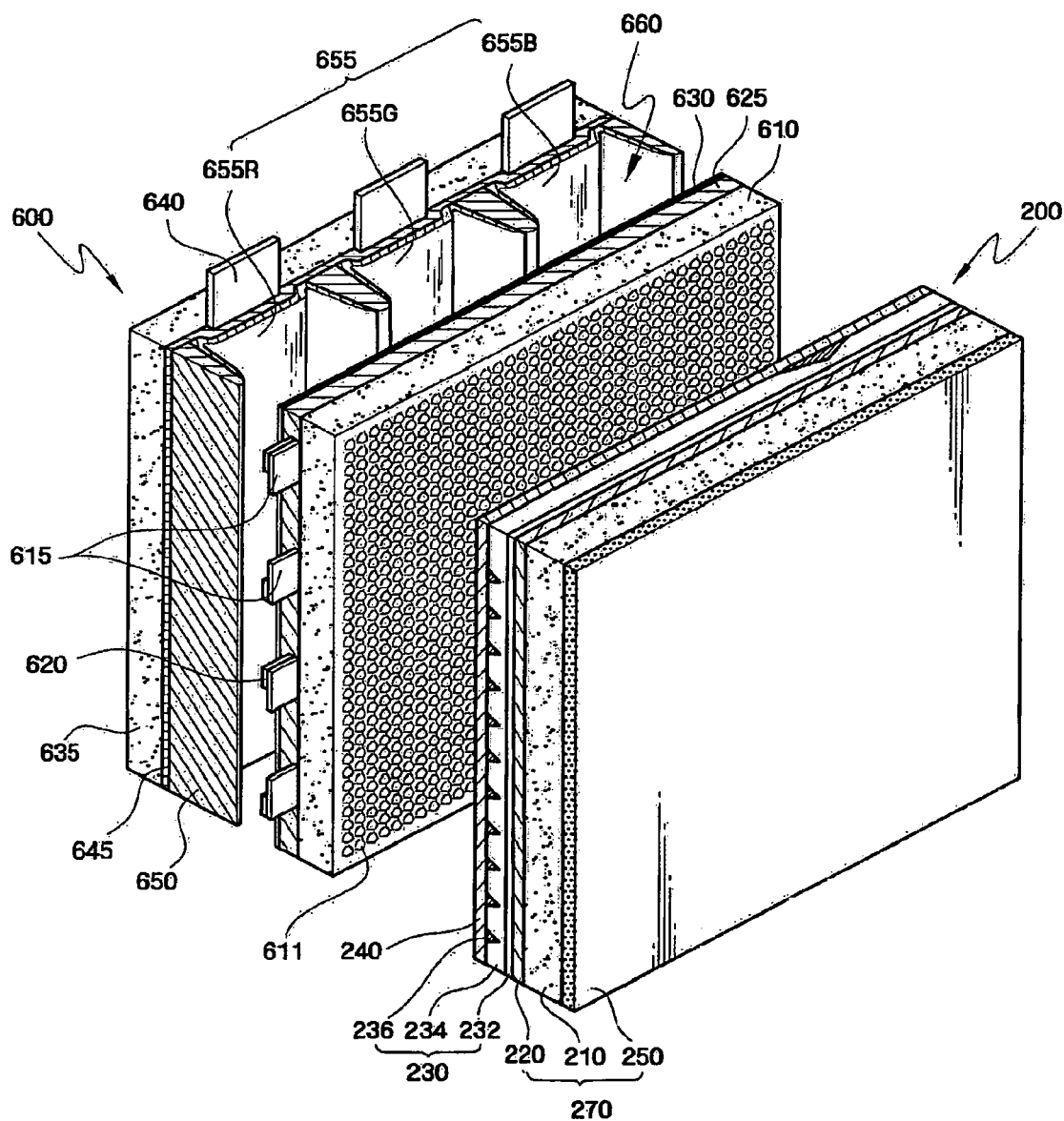
FIG. 8 is an exploded perspective view illustrating a PDP according to still another embodiment of the present invention.

Hereinafter, a PDP according to another embodiment of the present invention will be described with reference to FIG. 8. FIG. 8 is an exploded perspective view illustrating a PDP according to another embodiment of the present invention. For the sake of clarity and ease of explanation, components each having the same function in all the drawings for describing the previous embodiment are respectively identified by the same reference numerals, and their repetitive description will be omitted.

Referring to FIG. 8, a PDP filter 200 has substantially the same structure as the PDP filter 700 shown in FIGS. 7A and 7B, except those given below; that is, in the current embodiment of the present invention, to prevent the Moiré fringes and the Newton ring phenomenon, a diffuse-reflection surface 611 formed by anti-glare treatment of a front substrate 610 of a panel assembly 600 is substituted for the diffusion layer 710 shown in FIGS. 7A and 7B. The diffuse-reflection surface 611 of the front substrate 610 opposing the PDP filter 200 is an anti-glare treated surface and induces the diffuse reflection of light so that light reflected from the front substrate 610 does not have a constant pattern, thereby preventing an interference phenomenon, resulting in no Moiré fringes nor the Newton ring phenomenon. The PDP of the current embodiment of the present invention may also include the PDP filter 700, which includes the diffusion layer 710 shown in FIGS. 7A and 7B.

Figure 9A:
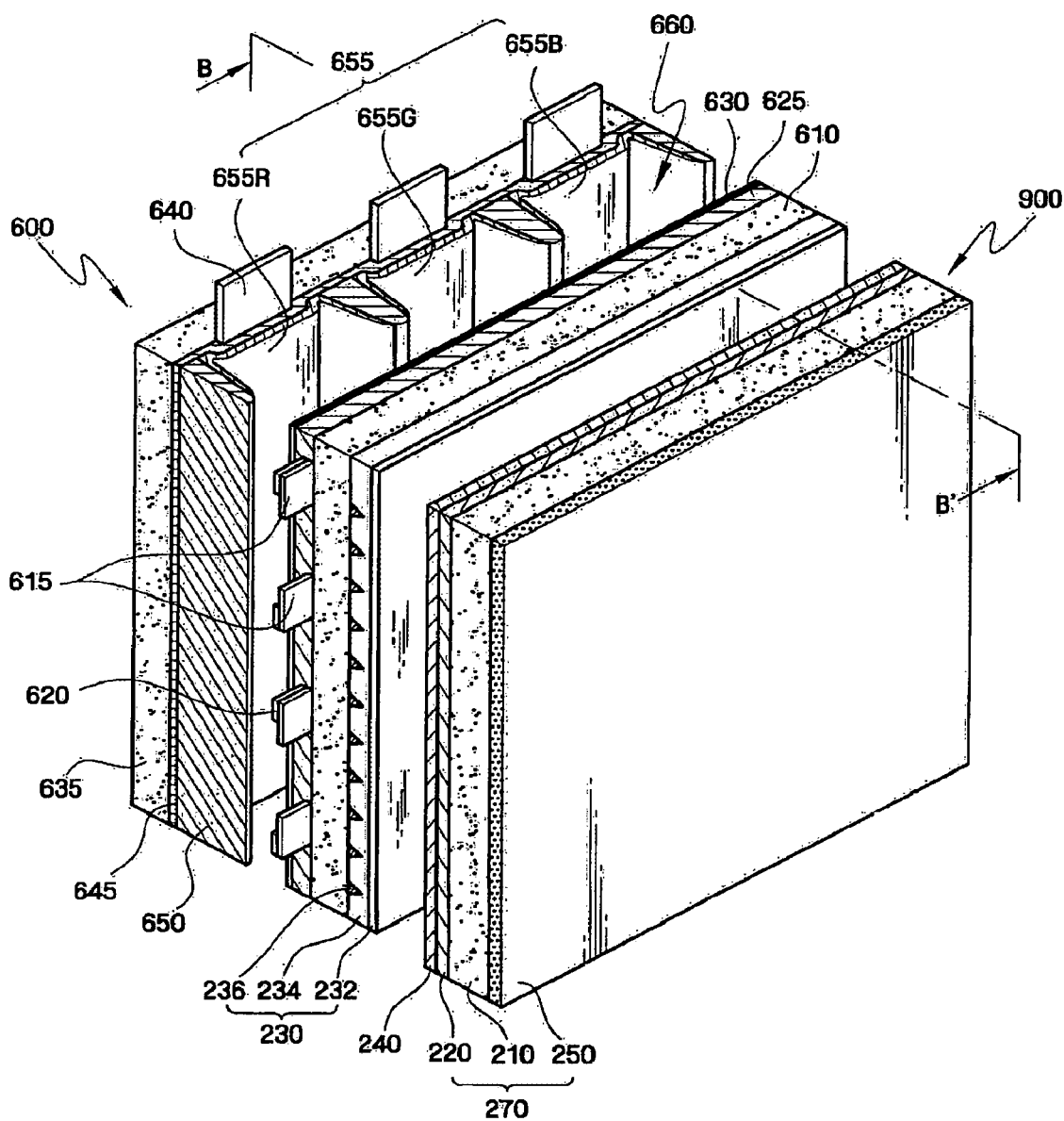
FIG. 9A is an exploded perspective view illustrating a PDP according to still another embodiment of the present invention.
Figure 9B:
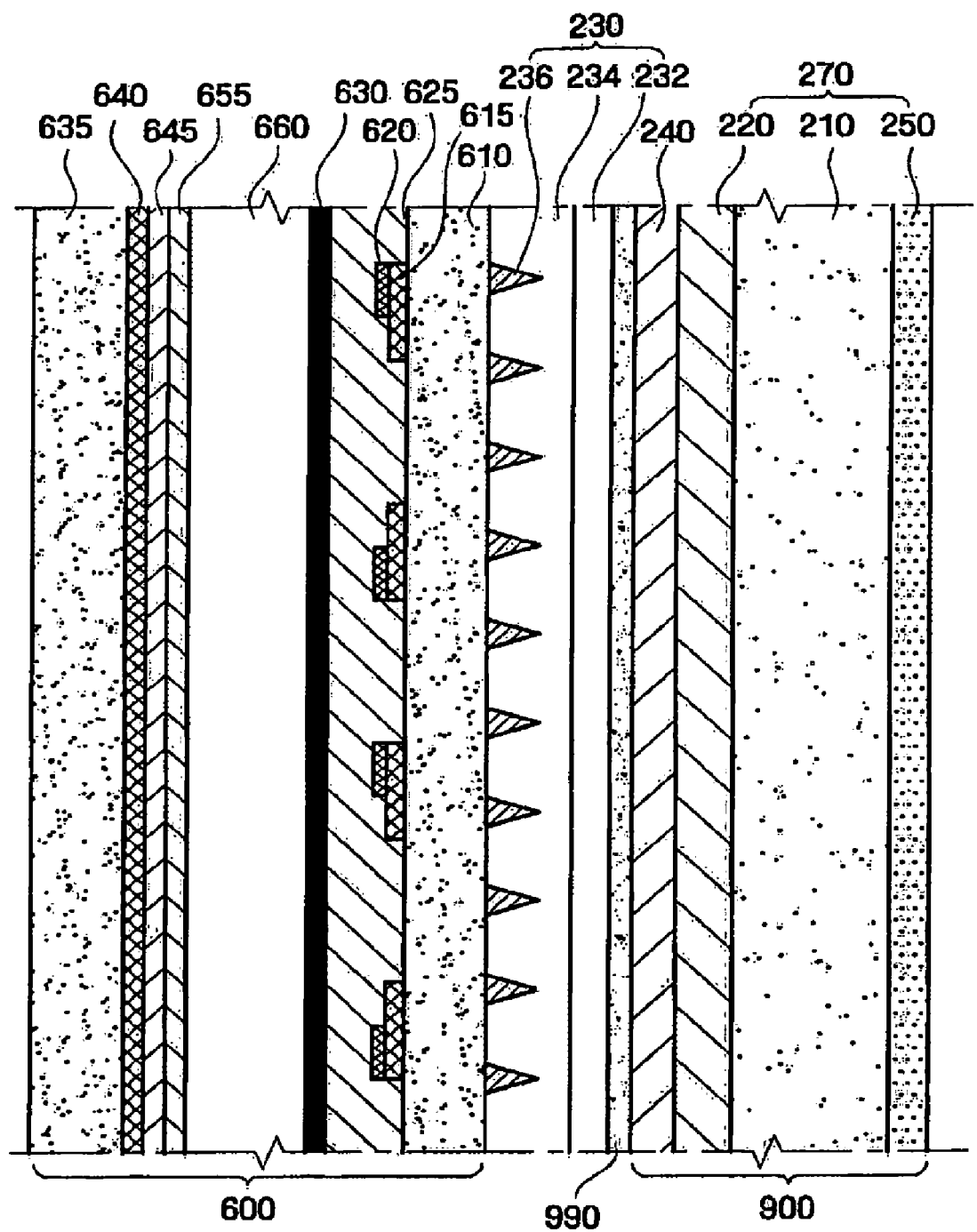
FIG. 9B is a sectional view taken along a line B-B' shown in FIG. 9A.

Hereinafter, a PDP according to still another embodiment of the present invention will be described with reference to FIGS. 9A and 9B. FIG. 9A is an exploded perspective view illustrating a PDP according to yet another embodiment of the present invention, and FIG. 9B is a sectional view taken along a line B-B' shown in FIG. 9A. For the sake of clarity and ease of explanation, components each having the same function in all the drawings for describing the first embodiment shown in FIGS. 1 through 6B are respectively identified by the same reference numerals, and their repetitive description will be omitted.

While the above-described embodiments of the present invention have illustrated that an external light-shielding layer, together with a filter base, constitutes a PDP filter in the current embodiment of the present invention, an external light-shielding layer is directly formed on or attached to a front substrate of a panel assembly, and a filter base is disposed on the external light-shielding layer to thereby complete a PDP.

Referring to FIGS. 9A and 9B, an external light-shielding layer 230 is directly disposed on or attached to a front substrate 610 of a panel assembly 600. A PDP filter 900 including a filter base 270 and a color correction layer 240 may be separated from the external light-shielding layer 230 of the front substrate 610 by a predetermined distance, as shown in FIG. 9A. Alternatively, to avoid side effects, e.g., light of external environments coming into a region between the panel assembly 600 and the PDP filter 900 or to reinforce the strength of the PDP filter 900, the PDP filter 900 may be attached to the front substrate 610 of the panel assembly 600 via an adhesive or bond 990, as shown in FIG. 9B.

The aforementioned PDP can also provide the same functions and advantages as those of the previous embodiments of the present invention.

While the embodiments of the present invention have been described separately, a combination of two or more embodiments among those embodiments that have been described above may also be within the scope of the present invention.

As described above, an external light-shielding layer according to the present invention, a display filter including the external light-shielding layer, and a display device including the display filter provide at least the following advantages: first, the luminance and contrast ratio of the display device can be enhanced by forming light-shielding patterns on the display filter; second, according to the invention, impaired display picture quality, such as Moiré fringe or Newton ring, can be effectively prevented by arranging external light-shielding layer or an EM radiation layer having light-shielding patterns or a mesh pattern at a predetermined bias angle with respect to a matrix.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A display filter comprising:
an external light-shielding layer formed on a transparent substrate and having a transparent resin matrix and a plurality of light-shielding patterns formed on a surface of the matrix and spaced apart from each other in a predetermined interval; and
a conductive EM radiation shielding layer including a mesh pattern and being disposed on the external light-shielding layer, the mesh pattern having a plurality of periodic stripes arranged in parallel,
wherein the extending direction of the light-shielding patterns is inclined with respect to the extending direction of the plurality of the periodic stripes of the mesh pattern with a bias angle ranging from about 50 to 75 degrees to reduce or prevent formation of Moiré patterns generated by superimposition of the mesh pattern and the light shielding patterns.

2. The display filter of claim 1, wherein each of the plurality of the external light-shielding patterns is defined by a wedge-shaped groove formed in an exposed surface of the matrix at which an incident light from a panel assembly is received, the groove extending from the exposed surface of the matrix to terminate at an apex beneath the surface and being filled at least partially with a dark material.

3. The display filter of claim 1, wherein an area of the bottom portion of the light-shielding patterns is about 20 to 50% of the surface of the matrix.

4. The display filter of claim 1, wherein the light shielding pattern is inclined with respect to a longer side of the matrix with an angle in a range of about 5 to about 80 degrees.

5. The display filter of claim 4, wherein the extending direction of the plurality of the periodic stripes of the mesh pattern is inclined toward the longer side of the matrix by a predetermined angle.

6. The display filter of claim 1, wherein the extending direction of the plurality of the periodic stripes of the mesh pattern is inclined toward the longer side of the matrix by a predetermined angle.

7. The display filter of claim 1, wherein the light-shielding patterns are shaped of wedge-black stripes, wedge-black matrices, wedge-black waves, flat-black stripes, flat-black matrices or flat-black waves.

8. The display filter of claim 1, further comprising a hemi-cylindrical or hemi-spherical lenticular lens focusing light and disposed on the matrix between each of the light-shielding patterns.

9. The display filter of claim 1, further comprising a plurality of bead lenses arrayed on one plane of the matrix, wherein the light-shielding patterns are sandwiched substantially between the matrix and each of the plurality of bead lenses.

10. The display filter of claim 1, wherein the light-shielding patterns are made of a black inorganic material and/or organic material, or a metal.

11. The display filter of claim 1, wherein the external light-shielding layer is disposed to face a panel assembly including a plurality of discharge cells, the panel assembly having a pixel pitch of about 0.5 to 2.5 mm, the light-shielding patterns having a pitch of about 0.07 to 0.11 mm, and being inclined with respect to a longer side of the matrix with an angle in a range of about 5 to 10 degrees.

12. The display filter of claim 1, wherein the external light-shielding layer is disposed to face a panel assembly including a plurality of pixels, and at least two light-shielding patterns correspond to a discharge cell.

13. The display filter of claim 1, wherein the external light-shielding layer is disposed to face a panel assembly including a plurality of pixels, and the display filter further comprises a diffusion layer on a surface of the display filter facing the panel assembly.

14. The display filter of claim 13, wherein the diffusion layer is an anti-glare treatment film.

15. The display filter of claim 1, wherein the conductive EM radiation shielding layer is disposed on a surface of the matrix, and the light-shielding patterns formed on another surface of the matrix.

16. A display device comprising:
a panel assembly including a transparent front substrate and a rear substrate disposed to face each other and a plurality of cells between the front substrate and the rear substrate; and the display filter of claim 1, facing the front substrate of the panel assembly.

17. The display filter of claim 16, wherein the front substrate has a diffuse-reflection surface formed by anti-glare treatment.

18. The display device of claim 16, wherein the front substrate of the panel assembly and the display filter are attached to each other by means of an adhesive or a bond.

19. The display device of claim 16, wherein each of the plurality of the external light-shielding patterns comprises a bottom portion exposed on one surface of the matrix, and inclined surfaces extending from the bottom portion and defining a wedge-shaped groove in the matrix.

20. The display device of claim 19, wherein the bottom portion faces the transparent front substrate of the panel assembly.

* * * * *